United States Patent [19]
Fischer et al.

[11] Patent Number: 5,988,121
[45] Date of Patent: *Nov. 23, 1999

[54] PISTON ENGINE HAVING A HYPOCYCLOIDAL PISTON STROKE TRANSMISSION WITH A WATT'S GUIDE, PARTICULARLY WITH PISTONS IN OPPOSED CYLINDERS

[75] Inventors: Gert Fischer, Feldafing; Johannes Hoehl, Maisoch, both of Germany

[73] Assignee: Bayerische Motoren Werke Aktiengesellschaft, Munich, Germany

[*] Notice: This patent is subject to a terminal disclaimer.

[21] Appl. No.: 09/011,652

[22] PCT Filed: May 7, 1997

[86] PCT No.: PCT/EP97/02341

§ 371 Date: Feb. 13, 1998

§ 102(e) Date: Feb. 13, 1998

[87] PCT Pub. No.: WO97/47860

PCT Pub. Date: Dec. 18, 1997

[30] Foreign Application Priority Data

Jun. 13, 1996 [DE] Germany ............................ 196 23 552

[51] Int. Cl.⁶ .................................................... F16H 21/34
[52] U.S. Cl. ........................ 123/55.2; 123/55.5; 123/55.7; 123/197.3; 123/197.4
[58] Field of Search ................................. 123/55.2, 55.5, 123/55.7, 197.3, 197.4

[56] References Cited

U.S. PATENT DOCUMENTS 4,779,472 10/1988 Brackett ........................................ 74/50
5,727,513 3/1998 Fischer .................................. 123/197.4

FOREIGN PATENT DOCUMENTS

| 37 23 950 | 8/1988 | Germany . |
| 37 23 948 | 11/1988 | Germany . |
| 41 08 311 | 9/1992 | Germany . |
| 42 05 283 | 8/1993 | Germany . |
| 44 12 165 | 9/1994 | Germany . |
| 195 04 890 | 8/1996 | Germany . |
| 92/17694 | 10/1992 | WIPO . |

OTHER PUBLICATIONS

"Calculating Watt's Straight–Line Transmissions" vol. 1/1980, German Democratic Republic with German title "Maschinenbautechnik" ("Mechanical Engineering Technology").

Primary Examiner—Noah P. Kamen
Assistant Examiner—Hai Huynh
Attorney, Agent, or Firm—Evenson, McKeown, Edwards & Lenahan, P.L.L.C.

[57] ABSTRACT

For a piston engine having a hypocycloidal piston stroke transmission with a Watt's guide, particularly having pistons in opposed cylinders, in which case the transmission is rotatably arranged on the crank pin of a crankshaft and comprises a stroke and a guide eccentric which are non-rotatably connected with one another, it is suggested for achieving the lowest transverse deviations of the stroke eccentric from the piston path that a path course 20 which is rendered uniform with respect to the transverse deviations $\Delta q_H$ of the stroke eccentric is achieved by means of a path course 21 of the guide eccentric achieved by way of parameters of the Watt's guide with maximal transverse deviations $\Delta_f$ up to and including the respective reversal point of the guide eccentric or of the Watt's connecting rod guiding it.

4 Claims, 2 Drawing Sheets

PISTON ENGINE HAVING A HYPOCYCLOIDAL PISTON STROKE TRANSMISSION WITH A WATT'S GUIDE, PARTICULARLY WITH PISTONS IN OPPOSED CYLINDERS

BACKGROUND AND SUMMARY OF THE INVENTION

The invention relates to a Diston engine having a hypocycloidal piston stroke transmission with a Watt's guide, particularly with pistons in opposed cylinders. An engine of this type is known from German Patent Document DE-A 41 08 311.

It is known that the connecting center point of a Watt's guide describes a precise straight-line path only by means of connecting control arms of an infinite length, whereas, in the case of real control arms of particularly short lengths, as, for example, on a piston engine, the connecting center point, along the overall stroke of the oscillating connecting rod, describes a path curve which is curved several times with respect to the fictitious or ideal straight guiding line and changes this straight guiding line.

The essay "Calculating Watt's Straight-Line Transmissions" in Volume 1/1980 of the journal of the German Democratic Republic with the title "Maschinenbautechnik" ("Mechanical Engineering Technology") shows particularly by means of a nomogram illustrated in Page 27 possibilities of adapting such a path curve in its deviations and courses according to the application of the Watt's guide as a function of its transmission parameters to the desired quality, of straight line guiding. It is the main goal to minimize the transverse deviations of the path curve of the connecting center point from the fictitious or ideal straight guiding line and to render the deviations uniform.

As it was found, such a design of a Watt's guide used in a hypocycloidal piston stroke transmission results in transverse displacements of such different dimensions of the stroke eccentric connected with respect to the drive with a piston push rod that any piston guiding is affected negatively.

It is an object of the invention to improve, in the case of a piston engine of the above-mentioned type having a hypocycloidal piston stroke transmission with a Watt's guide, the moving course of stroke eccentric transversely to its moving path such that, with respect to the amount, transverse displacements of the stroke eccentric which are approximately identical are achieved and thus also, by way of the piston stroke, of the piston connected with it.

This object is achieved by providing a piston engine having a hypocycloidal piston stroke transmission with a Watt's guide, particularly with pistons in opposed cylinders. A stroke eccentric is connected, with respect to the drive, with a push rod of a piston guided in a cylinder. A guide eccentric is guided orthogonally to the stroke eccentric path or piston path by means of the Watt's guide. The stroke eccentric and guide eccentric are arranged on the crank pin of a crankshaft. The guide eccentric is non-rotatably connected with the stroke eccentric and is rotatably disposed in a Watt's connecting rod controlled by way of control arms swivellably disposed on the motor housing. Parameters of the Watt's guide are selected such that a path course is forced upon the guide eccentric, which oscillates orthogonally with respect to the path of the stroke eccentric or piston, along each moving range close to its respective reversal point by means of the Watt's connecting rod which progressively deviates from the ideal orthogonal guide path such that, during each passage of the stroke eccentric through the intersection point of the guide path with the path of the stroke eccentric or piston path the guide eccentric has a maximal deviation $\Delta q_F$ from the ideal guide path.

By means of the invention, the transverse deviations of the stroke eccentric which is connected with the piston push rod with respect to the drive, which differ considerably particularly with respect to the amounts, are advantageously rendered uniform to an advantageously selectable extent of transverse deviation which significantly reduces the influence on a transverse displacement/slant of the piston in the respective cylinder. This is achieved by means of a course of the path of the connecting center point which deviates in a targeted manner and thus of the guide eccentric center point with a largest possible deviation in the respective reversal point of the connecting rod only by means of a coordination of the parameters of the Watt's guide according to the invention which differs from the known state of the art.

In a further development of the invention, the length of the control arms was recognized as the advantageously dominant parameter of the Watt's guide which is obtained in the case of the zero position of the Watt's connecting rod with the center point $M_{FE}$ of the guide eccentric situated in the intersection point of the guide path and the stroke eccentric or piston path and with control arms extending essentially in parallel to the stroke eccentric path, specifically as follows:

$$L_{control\ arm} = h + 0.17765 \times s \times (4 \times h/s)^{-1.0335}$$

wherein s=piston stroke and h=distance of a housing-side control arm point of rotation from the guide path, and the following is the definition range: $3.5 \leq (4 \times h/s) \leq 15$.

The formula according to the invention for the length of the control arms of the Watt's connecting rod advantageously permits by means of only two definable construction data of a piston engine of the above-mentioned type a design of the Watt's guide according to the invention when used in a hypocycloidal piston stroke transmission. A characteristic of the design according to the invention is a path course which is as straight as possible with transverse deviations of a low amount of the stroke eccentric connected with respect to the drive with the piston push rod which are rendered uniform, achieved by extreme transverse deviations from the ideal or fictitious guide path in close ranges of its reversal points of the guide eccentric non-rotatably connected with the stroke eccentric about the crank pin of the crankshaft by means of the Watt's connecting rod (FIG. 3).

Other objects, advantages and novel features of the present invention will become apparent from the following detailed description of the invention when considered in conjunction with the accompanying drawings.

BRIEF DESCRIPTION OF THE DRAWINGS

FIG. 4 is a diagram of the Watt's straight-line guide with the design data.

DETAILED DESCRIPTION OF THE DRAWINGS

Figure 1:
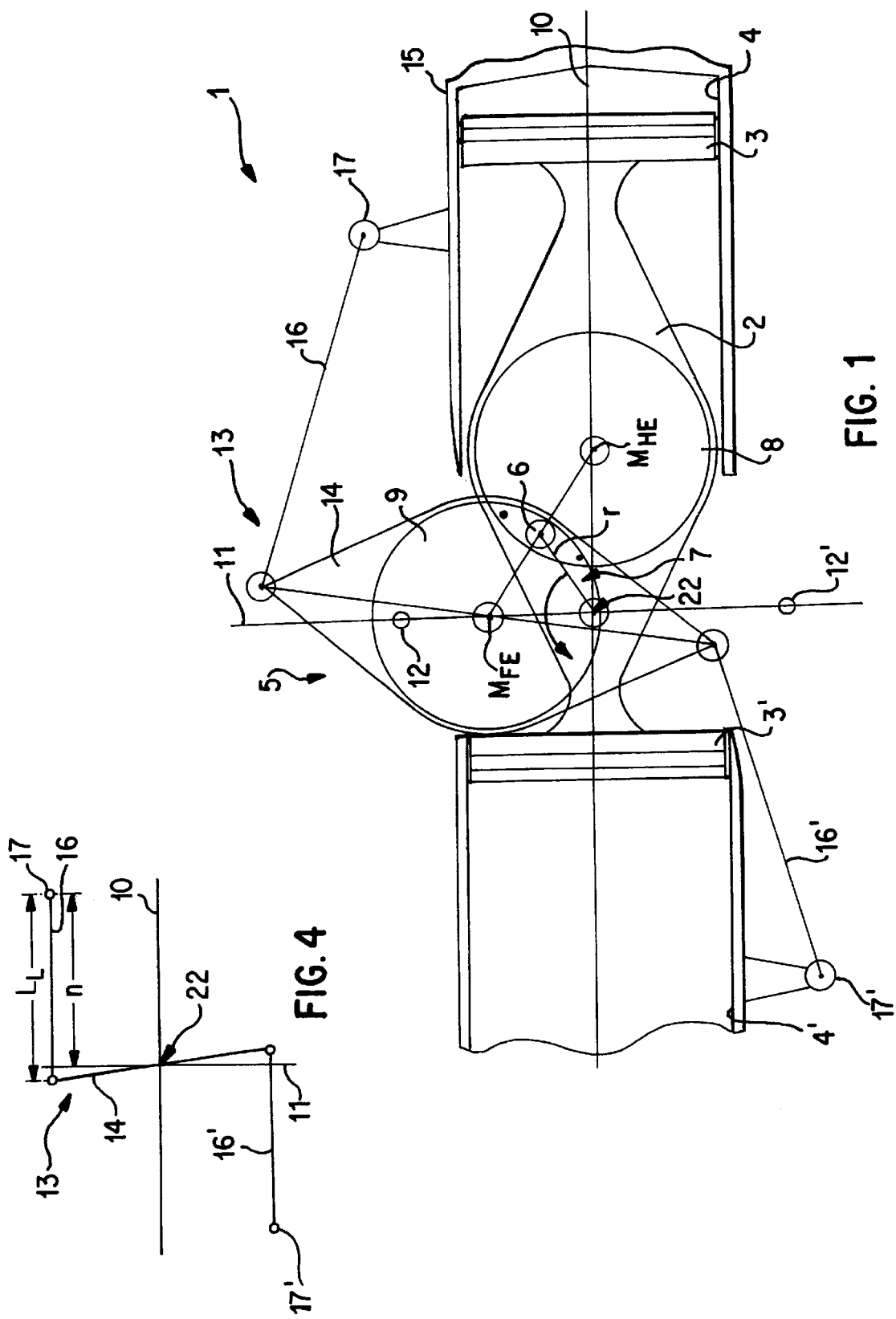
FIG. 1 is a view of a piston engine in a flat construction with a hypocycloidal piston stroke transmission with a Watt's guide.

Referring to FIG. 1, a piston engine 1, which preferably has a flat construction, particularly an internal-combustion engine, comprises pistons 3, 3' in opposed cylinders, 4, 4' which pistons are connected by way of a common push rod 2. A schematically illustrated hypocycloidal stroke transmission 5 comprises a stroke eccentric 8, which is in each case rotatably arranged on a crank pin 6 of a crankshaft 7, and a guide eccentric 9 which are both non-rotatably connected with one another. The stroke eccentric 8 is rotatably arranged in the push rod 2 and moves this push rod 2 in an oscillating manner along the straight line 10 which at the same time is the ideal stroke eccentric path or piston path.

Orthogonally to the stroke eccentric path or piston path 10, a straight-line guide path 11 is arranged which is typical of the hypocycloidal stroke transmission 5 and along which the guide eccentric 9 oscillates between the reversal points 12, 12'. As the straight-line mechanism for the guide eccentric 9, a Watt's guide 13 is provided which has a connecting rod 14 which rotatably receives the guide eccentric 9 and which is guided by way of control arms 16, 16' swivellably disposed on the motor housing 15. The control arms 16, 16' are disposed to be swivellable in housing-side points 17, 17' of rotation.

Figure 2:
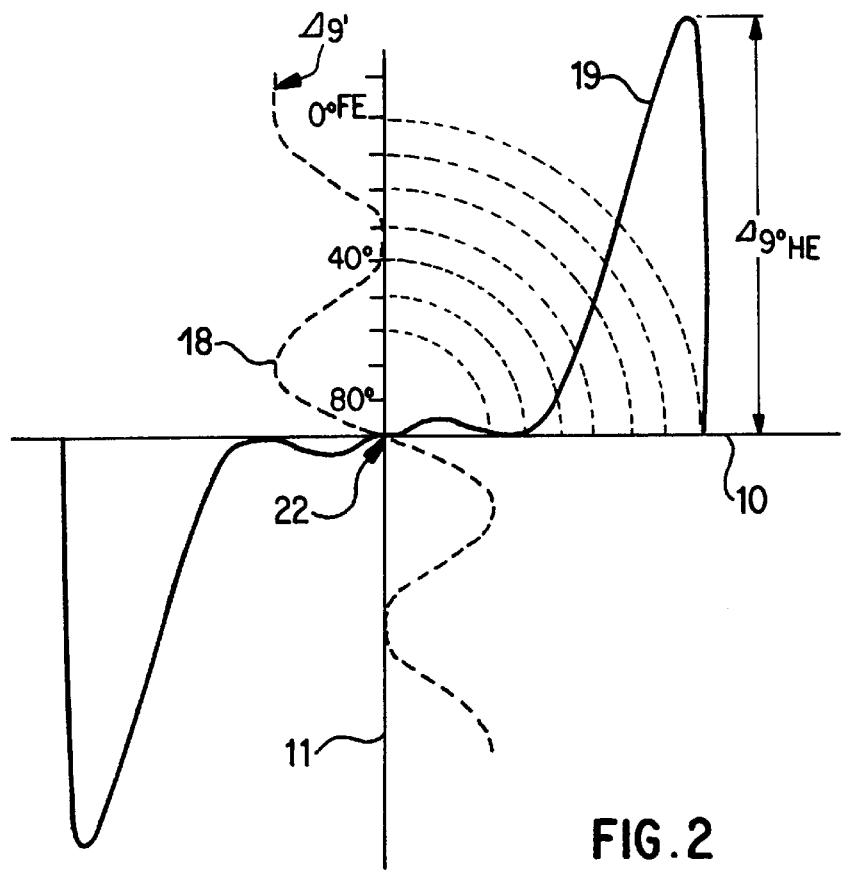
FIG. 2 is a view of the course of the path of the stroke eccentric in the design according to the state of the art.

In the case of the Watt's guide 13 designed according to the state of the art, which has a path course 18 which is optimally adapted to the ideal straight-line guide path 11 with $\Delta q'_{FE}$ of the connecting rod center point or of the center point $M_{FE}$ of the guide eccentric 9 according to FIG. 2, a path course 19 is obtained according to this FIG. 2 for the center point $M_{HE}$ of the stroke eccentric 8 which, particularly with respect to the amount, has very different transverse displacements $\Delta q'_{HE}$ which have a disadvantageous effect on the guides of the pistons 3, 3' in the cylinders 4, 4'.

Figure 3:
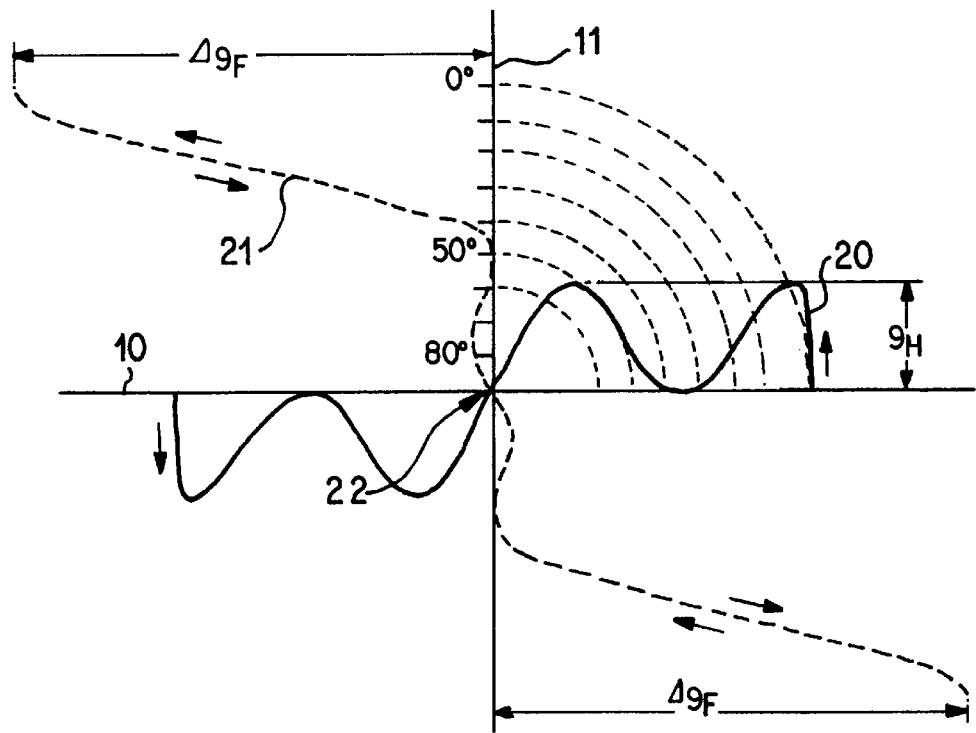
FIG. 3 is a view of the course of the path of the stroke eccentric in the case of the design according to the invention.

For achieving transverse displacements $\Delta q_H$ of approximately the same amount and of a desirably small extent for the stroke eccentric 8 according to the path course 20 in FIG. 3, parameters of the Watt's guide 13 are selected such that a path course 21 is forced upon the guide eccentric 9, which oscillates orthogonally with respect to the path 10 of the stroke eccentric or piston, along each moving range close to its respective reversal point 12, 12' by means of the Watt's connecting rod 14 which progressively deviates from the ideal orthogonal guide path 11 such that, during each passage of the stroke eccentric 8 through the intersection point 22 of the guide path 11 with the path 10 of the stroke eccentric or piston path the guide eccentric 9 has a maximal deviation $\Delta q_F$ from the ideal guide path 11.

This targeted deviation close to the reversal point is achieved according to the invention by way of the parameter of the length $L_L$ of the control arms 16, 16' which is obtained in the case of the zero position according to FIG. 4 of the Watt's connecting rod 14 with a center point $M_{FE}$ of the guide eccentric 9 situated in the intersection point 22 of the guide path and the stroke eccentric path or piston path 10, and with control arms 16, 16' which extend essentially in parallel to the stroke eccentric path 10, specifically:

$$L_{control\ arm} = h + 0.17765 \times s\ (4 \times h/s)^{-1.0035}$$

wherein s=piston stroke and h=distance of a housing-side control arm point of rotation 17, 17' from the guide path 11, as indicated in detail in the diagram of FIG. 4. The following definition range applies to the formula of the control arm length $L_L$ according to the invention:

$$3.5 \leq (4 \times h/s) \leq 15.$$

In the case of a crank radius of r=20 units of length (LE) for the crank pin 6 of the piston engine, which is selected as an example, and a thus determined eccentricity e=20 (LE) for the stroke eccentric 8 and the guide eccentric 9, and a resulting piston stroke s=4×e=80 LE, the distance h of a housing-side control arm point of rotation 17, 17' from the guide path 11 with h≧160 LE placed in the control arm length formula $L_L$ according to the invention for a transverse deviation $\Delta q_H$ of the stroke eccentric 8 from the stroke eccentric path or piston path 10 results in a value of $\Delta q_H = \leq 0.005$ LE, wherein, as a further parameter of the Watt's connecting rod 14, its length is selected with $L_K \geq 140$ LE.

The foregoing disclosure has been set forth merely to illustrate the invention and is not intended to be limiting. Since modifications of the disclosed embodiments incororating the spirit and substance of the invention may occur to persons skilled in the art, the invention should be construed to include everything within the scope of the appended claims and equivalents thereof.

What is claimed is:

1. A piston engine having a hypocycloidal piston stroke transmission with a guide, comprising:

a crankshaft having a crank pin;

a pair of pistons arranged in opposed cylinders and movable along a piston path;

a push rod connecting said pistons;

a stroke eccentric connected with the crank pin and with the push rod;

a guide eccentric connected with the crank pin and non-rotatably connected with the stroke eccentric, said guide eccentric oscillating between respective reversal points, along a path course deviating from an ideal guide path;

a guide including a connecting rod rotatably connected to said guide eccentric, and a pair of control arms swivellably disposed about control points on the motor housing and connected to the connecting rod, wherein parameters of the guide are selected such that during each passage of the stroke eccentric through an intersection point of the ideal guide path with the piston path, the guide eccentric has a maximal deviation from the ideal guide path.

2. A piston engine according to claim 1, wherein a length ($L_L$) of the control arms is selected such that in a zero position of the connecting rod with a center point of the guide eccentric situated at the intersection point and with the control arms extending essentially in parallel to the piston path:

$$L_L = h + 0.17765 \times s\ (4 \times h/s)^{-1.0335}$$

wherein s=a stroke of said pistons, and h=a distance between the control points and the ideal guide path, and where $$3.5 \leq (4 \times h/s) \leq 15.$$

3. A piston engine according to claim 2, wherein with a selected eccentricity e=20 (LE) and a resulting piston stroke s=4×e=80 (LE), the distance h of the control points from the ideal guide path 11 with h≧160 (LE) is placed in the control arm length formula $L_L$ for a transverse deviation $\Delta q_H$ of the stroke eccentric from the piston path of $\Delta q_H \leq 0.005$ (LE), wherein a length ($L_K$) of the connecting rod is selected to be $L_K \geq 140$ (LE).

4. A piston engine having a hypocycloidal piston stroke transmission with a guide, comprising:

a crankshaft having a crank pin;

a pair of pistons arranged in opposed cylinders and movable along a piston path;

a push rod connecting said pistons;

a stroke eccentric connected with the crank pin and with the push rod;

a guide eccentric connected with the crank pin and non-rotatably connected with the stroke eccentric, said guide eccentric oscillating between respective reversal points, along a path course deviating from an ideal guide path;

a guide including a connecting rod rotatably connected to said guide eccentric, and a pair of control arms swivellably disposed about control points on the motor housing and connected to the connecting rod, wherein a length ($L_L$) of the control arms is selected such that in a zero position of the connecting rod with a center point of the guide eccentric situated at the intersection point and with the control arms extending essentially in parallel to the piston path:

$$L_L = H + 0.17765 \times s \ (4 \times h/s)^{-1.0335}$$

wherein s=a stroke of said pistons, and h=a distance between the control points and the ideal guide path, and where $$3.5 \leq (4 \times h/s) \leq 15.$$

* * * * *